No. 632,205. Patented Aug. 29, 1899.
C. REIMULLER.
CAR VENTILATOR.
(Application filed June 20, 1899.)
(No Model.)
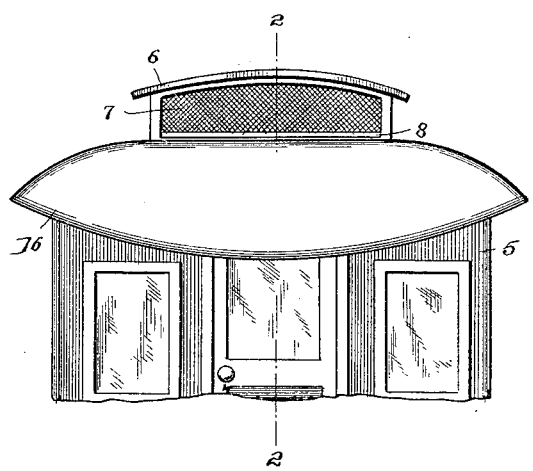
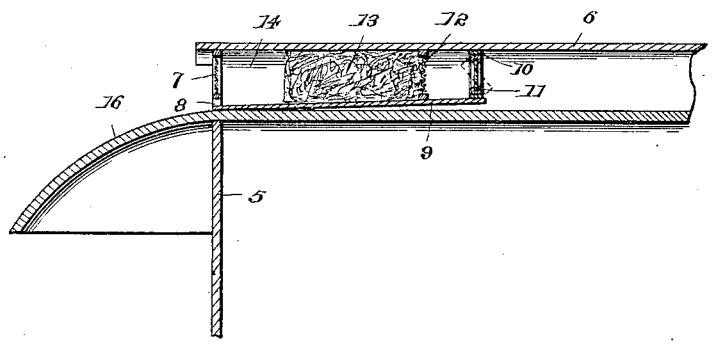
Witnesses
F. C. Alden
Geo. H. Chandlee
Charles Reimuller Inventor.
By his Attorneys,
C. A. Snow & Co.

UNITED STATES PATENT OFFICE.

CHARLES REIMULLER, OF BELMAR, NEW JERSEY.

CAR-VENTILATOR.

SPECIFICATION forming part of Letters Patent No. 632,205, dated August 29, 1899.

Application filed June 20, 1899. Serial No. 721,220. (No model.)

*To all whom it may concern:*

Be it known that I, CHARLES REIMULLER, a citizen of the United States, residing at Belmar, in the county of Monmouth and State of New Jersey, have invented a new and useful Car-Ventilator, of which the following is a specification.

This invention relates to car-ventilators; and it has for its object to provide, in connection with the cupola or other convenient portion of a car, a ventilator which will not only prevent the passage of cinders therethrough, but which will furthermore filter the air of smoke and other gases and from which the exceedingly small particles thus filtered will be discharged.

In the drawings forming a portion of this specification and in which like numerals of reference designate corresponding parts in both views, Figure 1 is a front elevation of the upper portion of a car provided with a ventilator constructed in accordance with this invention. Fig. 2 is a section on line 2 2 of Fig. 1.

Referring now to the drawings, 5 represents the body of a car, upon the upper portion of which is the usual cupola 6. The front end of this cupola is open and is provided with a partial filling 7, consisting of a screen of wire or other suitable material which reaches from the upper wall of the opening to a line adjacent the lower wall thereof, resulting in the formation of an interspace 8 between the screen and the lower wall of the opening.

Arranged transversely of the forward end of the cupola is a floor 9, which extends from the interspace 8 rearwardly and slants upwardly for a suitable distance, said floor being connected at its inner edge with a frame 10, in which is pivoted a transom 11, having suitable closing means of usual construction. Through the medium of this transom the ventilating-passage inclosed by the floor and the sides and roof of the cupola may be opened or closed.

Intermediate the screen 7 and the transom 11 and adjacent the latter is a screen 12, mounted in a suitable frame and completely filling the ventilator-passage transversely and vertically.

Intermediate the screens 7 and 12 and in engagement with the latter is a body of raw cotton or other suitable filtering material, the front end of which body is separated from the screen 7 by an interspace 14, forming a chamber for purposes to be presently explained.

The operation of the device is as follows: When the transom 11 is in the position shown in full lines in Fig. 2, the ventilating-passage is closed and the apparatus lies dormant. If the transom be then opened and a draft be directed upon the screen 7, the air will pass through said screen and into the chamber 14, from which it will pass through the filtering material 13 and the screen 12, and thence through the transom-opening and into the cupola. In the passage of the air through the screen 7 all large particles of dust and cinders are separated from the air and fall downwardly upon the water-shed 16 of the roof of a car, from which they are expelled. The smaller particles which pass through the screen 7 are passed through the chamber 14 and into engagement with the filtering material 13, which acts to separate them from the air and from which they may fall upon the floor of the chamber 14. The pure air passes rearwardly through the screen 12 and transom 2 into the cupola. The floor 9 of the ventilator-passage being sloped outwardly and downwardly the particles which fall thereon are gradually moved in the direction of and through the interspace 8 by the jostling or jolting of the car. It will thus be seen that when the air has passed through this ventilator it is freed of its impurities, and, moreover, the solid portions of these impurities are discharged from the ventilator, and hence do not interfere with the effective working of the device.

It will be readily understood that I may employ any desired materials for the different parts of the construction that may be found applicable and that I may depart from the specific construction and arrangement shown without departing from the spirit of the invention.

Having thus described the invention, what is claimed is—

1. A ventilator comprising a passage, a screen at the inlet end of the passage separated from the floor thereof by an interspace, a filtering material within the passage and separated from the screen by an interspace, and an adjustable closure for the rear end of the passage.

2. A ventilator comprising a passage, a screen at the inlet end of the passage separated from the floor thereof by an interspace, a second screen within the passage, a filtering material intermediate the screens and separated from the first-named screen by an interspace, and an adjustable closure for the passage.

3. A ventilator comprising a passage having a forwardly and downwardly slanting floor, a screen at the inlet end of the passage and separated from the floor by an interspace, a second screen within the passage, a filtering material within the passage engaging the second screen and separated from the first-named screen by an interspace, and an adjustable closure at the rear end of the passage.

In testimony that I claim the foregoing as my own I have hereto affixed my signature in the presence of two witnesses.

CHARLES REIMULLER.

Witnesses:
 JOHN H. COE,
 J. E. REIMÜLLER.